US010470216B2

(12) United States Patent
Gunnarsson et al.

(10) Patent No.: US 10,470,216 B2
(45) Date of Patent: Nov. 5, 2019

(54) METHODS AND DEVICES FOR CONTROLLING ANTENNA POINTS

(71) Applicant: Telefonaktiebolaget L M Ericsson (publ), Stockholm (SE)

(72) Inventors: Fredrik Gunnarsson, Linköping (SE); Bo Hagerman, Tyresö (SE); Gunnar Mildh, Sollentuna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 14/899,654

(22) PCT Filed: Jun. 19, 2013

(86) PCT No.: PCT/SE2013/050730
§ 371 (c)(1),
(2) Date: Dec. 18, 2015

(87) PCT Pub. No.: WO2014/204365
PCT Pub. Date: Dec. 24, 2014

(65) Prior Publication Data
US 2016/0135226 A1    May 12, 2016

(51) Int. Cl.
*H04W 74/08* (2009.01)
*H04W 74/00* (2009.01)
(Continued)

(52) U.S. Cl.
CPC ... *H04W 74/0833* (2013.01); *H04W 72/0413* (2013.01); *H04W 72/12* (2013.01);
(Continued)

(58) Field of Classification Search
CPC .......... H04W 74/0833; H04W 74/004; H04W 72/0413; H04W 74/0866; H04W 72/0406;
(Continued)

(56) References Cited

U.S. PATENT DOCUMENTS

| 2009/0303896 A1 | 12/2009 | Che et al. |
| 2011/0014922 A1* | 1/2011 | Jen ...................... H04W 74/002 455/450 |

(Continued)

FOREIGN PATENT DOCUMENTS

| EP | 2493252 A1 | 8/2012 |
| WO | 2009084924 A2 | 7/2009 |
| WO | 2012082053 A1 | 6/2012 |

*Primary Examiner* — Jay Y Lee
*Assistant Examiner* — Aixa A Guadalupe Cruz
(74) *Attorney, Agent, or Firm* — Murphy, Bilak & Homiller, PLLC (57) ABSTRACT

The teachings presents a method 10 performed in a network node 2, the network node 2 controlling a first and a second antenna point 3, 4. The network node 2 uses the same random access resources for the first and the second antenna points 3, 4. The method 10 comprises: detecting 11 a specific random access preamble received on a random access resource at the first antenna point 3 and on the same random access resource at the second antenna point 4; and scheduling 12 a transmission of a random access response to the random access preamble received at the first antenna point 3 and a transmission of a random access response to the random access preamble received at the second antenna point 4, the random access responses being scheduled separated in time and/or space. The teachings also presents corresponding devices.

19 Claims, 3 Drawing Sheets

(51) Int. Cl.
*H04W 72/04* (2009.01)
*H04W 72/12* (2009.01)
*H04W 72/08* (2009.01)

(52) U.S. Cl.
CPC ...... *H04W 74/004* (2013.01); *H04W 72/0406* (2013.01); *H04W 72/082* (2013.01); *H04W 74/0816* (2013.01); *H04W 74/0866* (2013.01)

(58) Field of Classification Search
CPC ............. H04W 72/082; H04W 74/006; H04W 74/0816; H04W 72/12; H04W 74/08; H04W 72/04; H04W 72/08
See application file for complete search history.

(56) References Cited

U.S. PATENT DOCUMENTS

2013/0029657 A1* 1/2013 Gao .................... H04W 74/004
455/422.1
2013/0083695 A1 4/2013 Narasimha et al.
2014/0362806 A1* 12/2014 Liu ...................... H04W 72/14
370/329

* cited by examiner

METHODS AND DEVICES FOR CONTROLLING ANTENNA POINTS

TECHNICAL FIELD

The technology disclosed herein relates generally to the field of wireless communication, and in particular to random access procedures within wireless communication systems.

BACKGROUND

Figure 1:
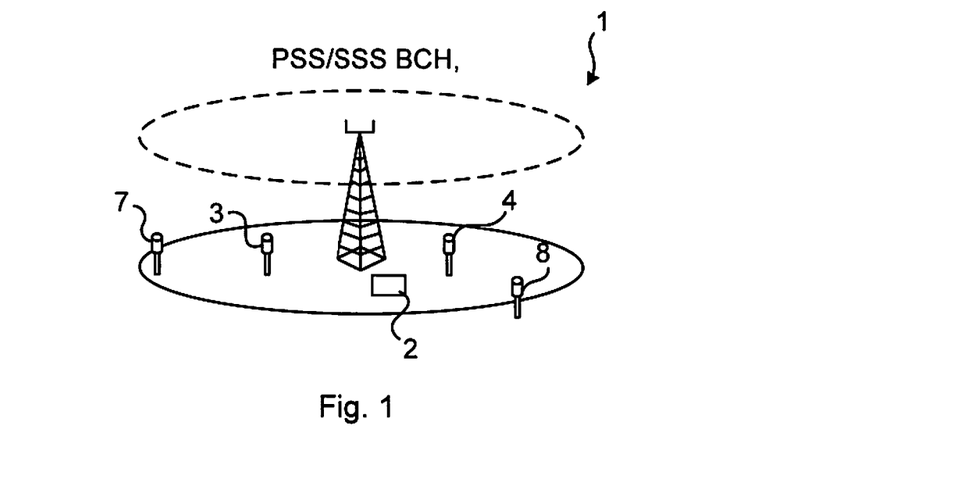
FIG. 1 illustrates schematically an environment in which embodiments of the present teachings may be implemented.

FIG. 1 illustrates a communication system 1 comprising several network nodes 2, 3, 4, 7, 8 providing wireless communication channels to wireless devices. The network nodes 2, 3, 4, 7, 8 may comprise enhanced Node Bs (eNodeB) or antenna points, and each network node 2, 3, 4, 7, 8 covers a certain area, cell, within which it provides the communication channels to wireless devices. A cell may be associated to one or more of an operational carrier, a radio access technology, an antenna system, a transmission power, a pilot or reference signal, etc. The cells may, but need not, be partly or completely overlapping. In FIG. 1, a first network node 2 provides a large cell within which a second and third network node 3, 4 are located. This scenario may be referred to as a macro/pico cell deployment. The first network node 2 provides the macro cell, and the second and third network nodes 3, 4 provide pico cells, the coverage of which lies entirely or partly within the macro cell. The first network node 2 may be denoted macro cell 2 and the second and third network nodes 3, 4 as pico cells 3, 4.

Figure 2:
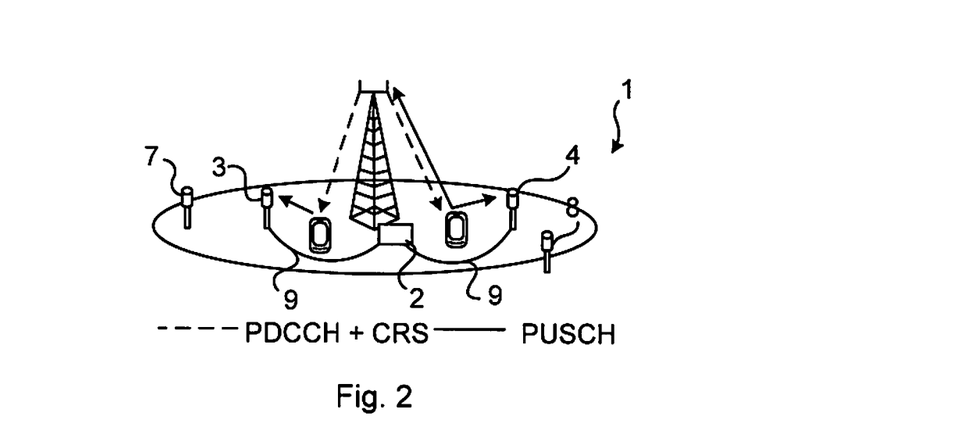
FIG. 2 illustrates schematically an environment in which embodiments of the present teachings may be implemented.

In the above scenario, by letting the second and third network nodes (pico cells) 3, 4 broadcast the same information as the first network node (macro cell) 2, for example system information such as primary synchronization signals/ secondary synchronization signals (PSS/SSS) and broadcast control channels (BCH), several advantages can be obtained, e.g. significant energy savings on the network side. This means that a wireless device does not perceive the pico cells 3, 4 as creating cells on their own. Instead, the wireless device considers both the pico cells 3, 4 and the macro cell 2 as one cell: a soft cell. The pico cells 3, 4 may comprise radio remote units or complete base stations, e.g. eNodeBs, with rather good backhaul (indicated in the FIG. 2 at reference numeral 9). In soft cells, a node hosting one or more antennas is denoted antenna point.

The soft cell enables the use of different sets of antenna points in the uplink and the downlink. For example, and with reference to FIG. 2, some wireless devices 5, 6 may use only the macro cell 2 for some downlink (DL) channels, while using a pico cell 3, 4 and/or the macro cell for uplink (UL) channels. DL channels are illustrated in the FIG. 2 by dashed arrows going from the first network node 2 to the wireless devices 5, 6 and the UL channels are illustrated by solid arrows going from the wireless devices 5, 6 to the network nodes 2, 3, 4.

A wireless device 5, 6 wanting to access the communication network 1 and obtain services therefrom registers and a random access procedure is initiated. The random access (RA) serves as an uplink control procedure to enable the wireless device 5, 6 to access the network 1. Since an initial access attempt cannot be scheduled by the network 1, the RA procedure is by definition contention based. Collisions may occur and an appropriate contention-resolution scheme needs to be implemented. To include user data on the contention-based uplink is not spectrally efficient due to the need for guard periods and retransmissions. Therefore the transmission of the random access burst (preamble), whose purpose is to obtain uplink synchronization, is separated from the transmission of user data.

In traditional deployments each cell is configured with a set of random access preambles and random access resources. When joining the antenna points serving these cells into a soft cell (also denoted combined cell or shared cell) they will share system information, as described above. Then, there will be only one set of random access preambles and random access resources for the soft cell. Of course, more random access resources could be configured up to a certain limit, but it is not possible to manage two different wireless devices 5, 6 using the same random access preamble in the same random access resources. Therefore, spatial random access gains are lost, potentially making the random access channel capacity a limiting factor for soft cell operations.

Figure 3:
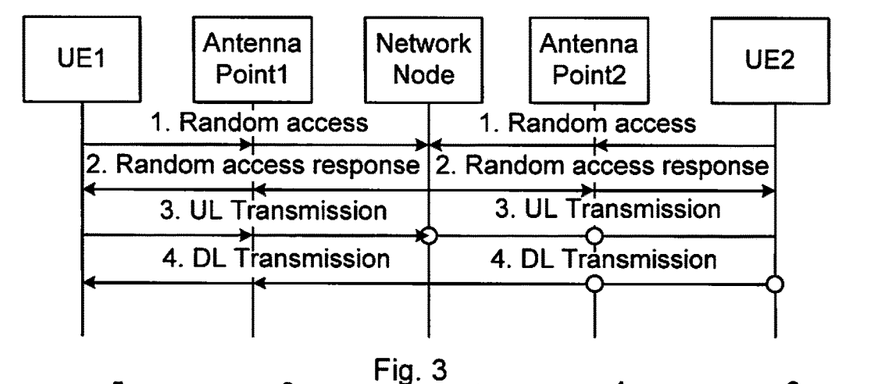
FIG. 3 illustrates prior art signaling between nodes of a communication network during a random access procedure.

FIG. 3 illustrate these problems, where two different wireless devices UE1, UE2 transmit (see arrows denoted 1) the same random access preamble in the same random access resource in a soft cell. The preambles are received by two antenna points (Antenna Point 1 and Antenna Point 2) and forwarded to a network node. The network node sends (see arrows denoted 2) a random access response over both antenna points and thereby reaches both wireless devices UE1, UE2 with an UL grant. Both wireless devices UE1, UE2 transmit (see arrows 3) using the UL grant, and these UL transmissions are received via the antenna points and forwarded to the network node. However, only the first wireless device UE1 is decoded in the network node (see arrow 3). The network node transmits (see arrow 4), via the antenna points a downlink message, aimed at the first wireless device UE1, and which the second wireless device UE2 cannot decode. Instead, the second wireless device UE2 will have to restart the random access procedure with a new preamble and resource selection.

Besides the obvious drawback for the user of the wireless device not obtaining access, and forced to perform the random access procedure again resulting in a delayed access, such insufficiency of radio resources also entails problems on a system level, e.g. in that soft cell solutions may be offered to users at the cost of lost random access spatial reuse.

SUMMARY

An object of the present teachings is to improve the above described situation, overcoming or at least alleviating one or more of the above mentioned shortcomings of prior art.

The object is according to a first aspect achieved by a method performed in a network node. The network node controls a first and a second antenna point and the network node uses the same random access resources for the first and the second antenna points. The method comprises: detecting a specific random access preamble received on a random access resource at the first antenna point and on the same random access resource at the second antenna point; and scheduling a transmission of a random access response to the random access preamble received at the first antenna point and a transmission of a random access response to the random access preamble received at the second antenna point, the random access responses being scheduled separated in time and/or space.

The method re-enables, for soft-cell solutions, the spatial gains with random access reception and responses of traditional deployments wherein each cell is configured with its own set of random access resources. The method thus enables the support of high capacity random access that scales with the number of network nodes despite that soft cell approaches are used. Advantages of using soft cells, e.g. increased downlink capacity, may be obtained while still having high capacity random access.

The object is according to a second aspect achieved by a network node configured to control a first and a second antenna point. The network node is configured to use the same random access resources for the first and the second antenna point. The network node comprises a processor and memory, the memory containing instructions executable by the processor, whereby the network node is operative to: detect a specific random access preamble received on a random access resource at the first antenna point and on the same random access resource at the second antenna point; and schedule a transmission of a random access response to the random access preamble received at the first antenna point and a transmission of a random access response to the random access preamble received at the second antenna point, the random access responses being scheduled separated in time and/or space.

Advantages corresponding to the above are obtained.

The object is according to a third aspect achieved by a computer program for a network node controlling a first and a second antenna point, wherein the network node uses the same random access resources for the first and the second antenna point. The computer program comprises computer program code, which, when run on the network node causes the network node to: detect a specific random access preamble received on a random access resource at the first antenna point and on the same random access resource at the second antenna point; and schedule a transmission of a random access response to the random access preamble received at the first antenna and a transmission of a random access response to the random access preamble received at the second antenna point, the random access responses being scheduled separated in time and/or space.

Advantages corresponding to the above are obtained.

The object is according to a fourth aspect achieved by a computer program product comprising a computer program as above, and a computer readable means on which the computer program is stored.

Advantages corresponding to the above are obtained.

Further features and advantages of the invention will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

It was noted in the background section, with reference to FIG. 1, that a cell may be associated to one or more of an operational carrier, a radio access technology, an antenna system, a transmission power, a pilot or reference signal, etc. In the examples given herein, all cells are associated to the same operational carrier and LTE as radio access technology. However, the teachings of the present application are equally applicable for cells that are differently configured.

For sake of completeness and in order to provide thorough understanding of the present teachings, the random access procedure in Long Term Evolution (LTE) is first described more in detail, with reference again to FIG. 3. It is noted that although LTE is mainly used for exemplifying the present teachings, also other access technologies can benefit from the teachings, such as for example Wideband Code Division Multiple Access (WCDMA) FIG. 3 thus illustrates signaling between a wireless device UE1, UE2 and a network node during such random access procedure according to prior art.

Phase 1, indicated by arrow 1, consists of transmission of a random access (RA) preamble, allowing the network node to estimate the transmission timing of the wireless device UE1, UE2. Uplink synchronization is necessary since this significantly facilitates the reception performance in the network node of signals from the wireless device 5, 6.

Prior to sending a preamble, the wireless device UE1, UE2 retrieves RA configuration information from the communication system 1. In one mode, the wireless device UE1, UE2 synchronizes to the downlink transmissions and reads the Broadcasted Control Channel (BCCH). In another mode, the wireless device UE1, UE2 receives RA configuration information from its currently serving cell, either RA configurations associated to its serving cell or a neighbor cell. The RA configuration information will reveal where the RA time slots are located, which frequency bands can be used, how the transmission power should be selected and which preambles (sequences) are available.

Based on the RA configuration information, the wireless device UE1, UE2 will select a preamble, an RA slot, and a transmission power to transmit the preamble. The preamble sequence implicitly includes an ID which identifies the wireless device UE1, UE2. LTE provides for each cell up to 64 such random IDs and thus 64 preambles.

If multiple RA frequency bands have been defined, the wireless device UE1, UE2 randomly, or based on specific instructions in the RA configuration information, selects one of them. The group of sequences allocated to a cell is partitioned into two subgroups. By selecting a preamble sequence from a specific subgroup, the wireless device 5, 6 can give a single-bit indication of its resource requirement and/or link quality. The particular sequence used for the preamble is randomly selected within the desired subgroup. This sequence implicitly contains an ID which serves as a wireless device UE1, UE2 identifier.

The eNode B estimates the UL timing of the wireless device UE1, UE2 based on the timing of the received preamble.

Phase 2, indicated by arrow 2, consists of the network node transmitting a timing advance command to correct the uplink timing, based on the timing of arrival measurement in the first phase. In addition to establishing uplink synchronization, the second phase also assigns uplink resources and a temporary identifier to the wireless device UE1, UE2 to be used in the third phase of the random access procedure.

After the preamble transmission, the wireless device UE1, UE2 waits for a RA Response message on the downlink shared channel (DL-SCH), the DL assignment which is indicated on the L1/L2 control channel (Dedicated Physical Control Channel, DPCCH). The RA Response message is transmitted semi-synchronously (i.e. within a window) to the reception of the RA Preamble in order to allow a scheduler more flexibility. The RA Response comprises: the same random wireless device UE1, UE2 identity as present in the preamble; a time alignment message to provide the proper uplink timing to the wireless device UE1, UE2; a temporary Radio Network Temporary Identifier (RNTI) which is unique for the particular RA resource (time, channel and preamble) used in Phase 1. For initial access, the radio network temporary identifier (RNTI) is used for Phases 3 and 4; and an UL resource grant for transmission on downlink shared channel (UL-SCH) in Phase 3.

If no RA response message has been received after a configurable time following the preamble transmission, the wireless device UE1, UE2 will apply a back-off procedure, if configured for it. A back-off value in the wireless device UE1, UE2 (signaled to the wireless device UE1, UE2 in a past RA Response message) will delay the transmission a randomly chosen time, between 0 and the indicated back-off value, before attempting random access again. The wireless device UE1, UE2 selects new, random parameters for the preamble sequence and the non-synchronized RA frequency band. Furthermore, the wireless device UE1, UE2 will increase the power level of the preamble to obtain a power ramping procedure similar as used in WCDMA.

Phase 3, indicated by arrow 3, comprises signaling from the wireless device UE1, UE2 to the network node using an uplink shared channel (UL-SCH) similar to normal scheduled data. A primary function of this message is to uniquely identify the wireless device UE1, UE2. The exact content of this signaling depends on the state of the wireless device UE1, UE2, e.g., whether it is previously known to the network node or not.

In Phase 3, the wireless device UE1, UE2 provides the network with a unique identifier in the message it transmits on UL-SCH according to the grant contained in the RA response. The type of wireless device UE1, UE2 identifier, e.g. Cell-RNTI (C-RNTI), Temporary Mobile Subscriber Identity (TMSI), International Mobile Subscriber Identity (IMSI) or International Mobile Equipment Identity (IMEI), depends on which extent the wireless device UE1, UE2 is already known in the network.

In case of initial access, the message is a Radio Resource Control (RRC) Connection Request message.

In case of non-initial access, i.e. when the wireless device UE1, UE2 is already RRC_CONNECTED, the wireless device UE1, UE2 identifier is the C-RNTI and is signaled by the Medium Access Control (MAC) layer.

The transmission uses Hybrid Automatic-Repeat-Request (HARQ) feedback.

Phase 4, indicated by arrow 4, comprises contention resolution in case multiple wireless device UE1, UE2 tried to access the network 1 on the same resource.

For cases where the network 1 knows, in advance, that a particular wireless device UE1, UE2 will perform a random access procedure to acquire uplink synchronization, a contention-free variety of the random access procedure has been agreed upon. This effectively makes it possible to skip the Contention Resolution process of phases 3 and 4 for important cases such as arrival to a target cell at handover (HO) and arrival of DL data.

The purpose of the fourth phase is thus to resolve contention. It is noted that, from the second phase, multiple wireless device UE1, UE2 performing simultaneously random access attempts using the same preamble listen to the same response message and therefore have the same temporary identifier. Hence, in the fourth phase, the network node echoes the wireless device UE1, UE2 identity provided by the wireless device UE1, UE2 in Phase 3. Only a wireless device UE1, UE2 which finds a match between the identity received in the fourth phase and the identity transmitted as part of the third phase will declare the random access procedure successful. This wireless device UE1, UE2 will also transmit a HARQ acknowledgement in the uplink. For non-initial access, i.e. when the wireless device UE1, UE2 is already RRC_CONNECTED, the wireless device UE1, UE2 identity is reflected on the L1/L2 control channel. If the wireless device UE1, UE2 has not yet been assigned a C-RNTI, the temporary identity from the second phase is promoted to the C-RNTI, otherwise the wireless device UE1, UE2 keeps its already assigned C-RNTI.

A wireless device UE1, UE2 which do not find a match between the identity received in Phase 4 and the respective identity transmitted as part of Phase 3 are considered to have failed the random access procedure and needs to restart the random access procedure with Phase 1; selecting new random parameters for the preamble sequence and the RA frequency band. No HARQ feedback is transmitted from this wireless device UE1, UE2.

For cases where the network 1 knows, in advance, that a particular wireless device UE1, UE2 will perform a Random Access Procedure to acquire uplink synchronization, a dedicated preamble is reserved and assigned to the wireless device UE1, UE2 under consideration. Dedicated Preamble assignment for HO is handled by RRC whereas preamble assignment for DL data arrival is handled by MAC. When the wireless device UE1, UE2 transmits the dedicated preamble in Phase 1, the network 1 knows to which wireless device UE1, UE2 this preamble was assigned and can already at the time of detection of this preamble determine the identity of the wireless device UE1, UE2. Thus no contention resolution is needed and the delay before data transmission can be resumed is reduced.

Briefly, in accordance with the present teachings, the random access preambles are detected at all antenna points 3, 4 (refer to FIGS. 1 and 2), and the detected preambles may be associated with an antenna point ID. All received preambles will be acknowledged (together with an uplink grant) over a downlink control channel from one or more of the antenna points 3, 4 that received the preamble and/or further antenna points 7, 8. The ACKs may be separated in time over a random access response window, and/or separated in space, and the wireless devices 5, 6 will discontinue downlink control channel monitoring upon a successful ACK reception. Thereby, the prior art solution is avoided where the random access response is transmitted over all antenna points 3, 4 simultaneously, and which would prevent handling of multiple spatially separated users using the same preamble in the same random access resource.

Figure 4:
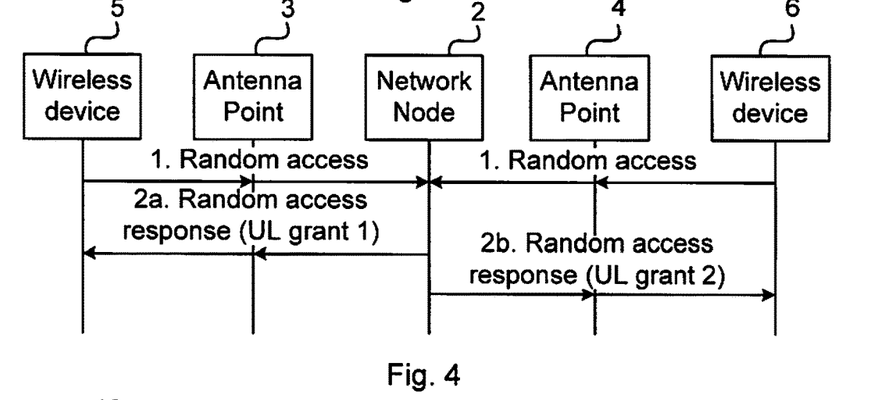
FIG. 4 illustrates signaling between nodes of a communication network during a random access procedure according to the present teachings.

FIG. 4 illustrates signaling between nodes 2, 3, 4, 5, 6 (compare FIGS. 1 and 2) of a communication network 1 during a random access procedure according to the present teachings.

At arrows 1, a first antenna point 3 and a second antenna point 4 both receive a specific random access response preamble in the same random access resource. In an embodiment, the network node 2 serving the two antenna points 3, 4 transmits the random access response in one time instant from the first antenna point 3 (arrow 2a) and at a later time instant from the second antenna point 4 (arrow 2b). Both transmission times may be within the random access response window. In another embodiment, the random access responses are sent separated in space. In still another embodiment, the random access responses are sent separated in time and space.

There are different scenarios: either a single wireless device 5 sent the random access preamble, and it was received by both antenna points 3, 4, or two different wireless devices 5, 6 transmitted the same random access preambles and it was received by a respective antenna point 3, 4.

If two different wireless devices 5, 6 transmitted the same random access preambles, and if they were received by two different antenna points 3, 4 respectively, then the random access procedures of both wireless devices 5, 6 can be completed even if the preambles were sent in the same random access resource. An improved use of the available random access preambles is provided, increasing the random access capacity.

By transmitting the random access response separated in time and/or space, it is possible to support concurrent random access requests from multiple wireless devices. In some embodiments the UL grants (UL grant 1, UL grant 2 of FIG. 4) are the same and in some they are different.

In the following, a description of Phase 1 according to the present teachings is given corresponding to the one given in relation to the prior art solution of FIG. 3, thus thoroughly detailing aspects of the present teachings in relation to the prior art.

The phase 1 can be divided into two sub-phases: the wireless device 5, 6 selecting RA resources to use, and random access preamble reception at the network node 2.

In case of contention-based random access, the wireless device 5, 6 selects a random access preamble and a random access resource at random from the resources that are announced available, either via broadcasted system information or via dedicated signaling from a radio access network node. In another embodiment, this information may be pre-configured as a default configuration.

If contention-free random access is considered, for example as part of handover but also in other situations, then the soft cell can be configured to spatially allocate the resources and preambles to enable simultaneous use of the same preambles and/or resources at spatially separated regions. Spatially separated regions are mainly characterized by that signals transmitted in a first region are not detected (or that detection is not probable) by antenna points in a spatially separated second region.

Hence, the wireless device 5, 6 acquires information about random access slots available, selects one of the available resources at random (the number of alternatives may be so reduced that only one alternative is available), and transmits the preamble using the selected resource.

RA Preamble Reception

Some or all antenna points 2, 3, 4 are receiving the transmitted random access preamble from the wireless device 5, 6. A random access preamble received at an antenna point 2, 3, 4 may be associated with a corresponding antenna point ID. This association can be made either at the antenna point 3, 4 or at a processor (for example centralized processor, not illustrated) related to the antenna point 3, 4.

This means that at a given radio resource unit (such as a time slot, a time/frequency slot etc.), a specific random access preamble may be received at multiple antenna points 3, 4. This can, as mentioned earlier, be due to that a random access preamble transmitted from one wireless device 5, 6 has been received by multiple antenna points 3, 4, that multiple wireless devices 5, 6 have selected the same preamble, or a combination of both.

Each reception of a random access preamble at an antenna point 2, 3, 4 may also be associated with reception conditions. Such reception conditions comprises for example: received signal power of random access preambles, received signal quality of random access preambles, received preamble signature correlation, and/or received signal correlation/power relative the detection threshold of the antenna point.

The reception conditions scope, i.e. which type of reception condition or conditions as exemplified above that shall be considered, may be configured via Operations Administration and Maintenance (OaM), or may be adjusted based on local observations at the antenna point 2, 3, 4. Such local observations of reception conditions comprise reception statistics such as historical preamble reception powers/correlations.

Phase 2: The wireless devices 5, 6 are configured to monitor downlink control channels for a random access response message. This monitoring is discontinued if the wireless device 5, 6 has received a random access response, or if a time window since the preamble transmission has elapsed.

All the received random access preambles will be acknowledged (together with an uplink grant) over a downlink control channel from one or more of the antenna points 3, 4 that received the preamble. It is noted that an antenna point, although not being the one receiving the preamble, may transmit an acknowledgement.

ACKs may be separated in time over a random access response window, and the wireless devices 5, 6 will discontinue downlink control channel monitoring upon a successful ACK reception. Hence:

If one wireless device 5 has received an ACK and an uplink grant, then it will not consider a random access response transmitted later in time.

If another wireless device 6 has not decoded an ACK and uplink grant from one node, then it may be able to decode the ACK and an uplink grant later in time, by receiving the ACK sent later in time.

The ACKs may alternatively be sent separated in space.

This means that two different wireless devices 5, 6 that sent the same random access preamble in the same random access resource can be responded to provided that the responses are separated in time and/or space.

Various embodiments may be implemented comprising different RA response scheduling across the different antenna points 2, 3, 4. In the following this is exemplified in the scenario described with reference to FIG. 2, i.e. the first network node 2 comprising a macro antenna point 2, the second and third network nodes 3, 4 comprising antenna points.

In an embodiment, the scheduling is performed so that RA responses are transmitted from the macro antenna point 2 first, and then from the other antenna points 3, 4 in decreasing reception condition order.

In an embodiment, the scheduling is performed so that RA responses are transmitted from the macro antenna point 2 first, and then in the other antenna points 3, 4 in decreasing transmission power order.

In an embodiment, the scheduling is performed so that RA responses are transmitted from the macro antenna point 2 first, and then in the other antenna points 3, 4 simultaneously, but at a later time.

In an embodiment, the scheduling is performed so that RA responses are transmitted from the antenna points (macro/pico) 2, 3, 4 in decreasing reception condition order.

In an embodiment, the scheduling is performed so that RA responses are transmitted from the antenna points 2, 3, 4 in decreasing transmission power order.

As an example, the order in which the random access response is sent is determined based on the reception conditions per antenna point 2, 3, 4. For example, if the antenna points 2, 3 and 4 receive a specific preamble at correlations (or received signal strength) C1, C2 and C3, respectively, where C1>C2>C3, then the random access response is first transmitted from antenna point 2, then antenna point 3 and finally antenna point 4. Alternatively, the antenna points 2, 3, 4 can be grouped, so that the random access response is transmitted first from antenna point 2, and then from antenna points 3 and 4.

When an antenna point 3, 4 with lower power is transmitting a response, higher power antenna points such as the macro 2 either transmit at a lower power at the control channel resource or do not transmit at the control channel resource used by the lower power antenna point 3, 4. Thereby, it is also possible to control the antenna point association by ensuring that random access responses can be received in areas where a low power antenna point is not the most favorable antenna point based on pilot signal received signal strength comparisons.

The means to implement the separation can be either by encoding the DPCCH differently from different antenna points 2, 3, 4, or using the enhanced-DPCCH (e-DPCCH), enabling control signaling specific for a particular wireless device 5, 6.

In case of contention-free random access (e.g. handover), a central processing unit (CPU) configured to handle random access requests may be confident that only one wireless device 5, 6 is assigned a specific preamble and random access resource. Therefore, ACKs over PDCCH can be sent at the same time to all antenna points. It is also noted, that the present teachings enables the assignment of one random access preamble and random access resource to more than one wireless device 5, 6, provided that random access responses are separated in time as descried above.

In case of contention-based random access, the RA phases 3 and 4 are the same as in prior art, meaning that two wireless devices 5, 6 selecting the same preamble and only received at one antenna point will collide in step 3, and only one of them will be acknowledged in step 4. The other one has to start over the RA procedure. However, if the wireless devices are spatially separated, then they will not use the same resource in step 3, and can thus be admitted both of them, see below where antenna point relations are used to support such operations.

Any uplink and downlink power imbalance can also be considered using reception condition information and antenna point transmission power information. For example, if the power difference between high power antenna points and low power antenna points is D, then the reception conditions may be modified using this difference so that the reception conditions at the wireless device 5, 6 can be estimated. For example, if the reception conditions at antenna points 2, 3 and 4 are C1, C2 and C3, where antenna points 2 and 3 are low power antenna points and antenna point 4 is using a power that is the offset D larger, then the modified reception conditions C1, C2 and C3+D are used. This means that even though C1>C2>C3, antenna point 4 may still be used first if D is large enough.

In general, the modified reception conditions are functions of the reception condition and the transmission power (alternatively the relative transmission power compared to a reference antenna point).

If the antenna points 2, 3 and 4 are using the transmission powers T1, T2 and T3, then the modified reception conditions are functions $f(C_i,T_i)$ of the reception conditions and transmission power. In case of considering a reference transmission power Tr, then the function $f(C_i,T_i,T_r)$ is considered. Example of functions can be in logarithmic scale $$f(C_i,T_i)=C_i+T_i$$

In linear scale $$f(C_i,T_i)=C_i*T_i$$

And with transmission powers relative a reference transmission power Tr, in logarithmic scale $$f(C_i,T_i,T_r)=C_i+T_i-T_r$$

In linear scale $$f(C_i,T_i,T_r)=C_i*T_i/T_r$$

In another embodiment, the antenna points 2, 3, 4 are associated to different receiver sensitivities $S_i$, either in absolute terms or relative to a reference sensitivity Sr. For example, in logarithmic scale $$f(C_i,S_i,S_r)=C_i+S_i-S_r$$

In linear scale $$f(C_i,S_i,S_r)=C_i*S_i/S_r$$

In general, both sensitivity and transmission power differences can be considered.

In other embodiments, antenna point relations are used, which indicate coverage overlaps between antenna points 2, 3, 4. This information can be prepared in OaM as will be described later, or pre-determined via configurations. There can also be reception relations (uplink coverage overlaps) and transmission relations (downlink coverage overlaps) separately.

The antenna point relations can be used in many different ways, and in the following some examples are given:

Example 1a

The same random access preamble is received in the same random access resource at a first and a second antenna point 3, 4 and the relation between the first and second antenna point 3, 4 indicates an uplink overlap. Then the random access responses may be transmitted separated in time. In a variation, the random access responses may further include different UL grants.

Example 1b

The same random access preamble is received in the same random access resource at a first and a second antenna point 3, 4 and the relation between the first and second antenna points 3, 4 indicates no downlink overlap. Then the random access responses are transmitted separated in space only and at same time is acceptable. In a variation, the random access response may further include different UL grants.

Example 1c

The same random access preamble is received in the same random access resource at a first and a second antenna point 3, 4 and the relation between the first and second antenna points 3, 4 indicates neither uplink nor downlink coverage overlap. Then the random access responses may be transmitted separated in space only, i.e. same time is acceptable. In a variation, the random access responses may further include the same UL grants, i.e. the transmitted messages can be identical.

Example 2a

A random access preamble is received at a first antenna point 3 but not at a second antenna point 4 at a specific random access resource and the relation between the first and second antenna points 3, 4 indicates downlink overlap. Then the random access responses may be transmitted from both the first and second antenna points 3, 4. In a variation, the random access responses may further include the same UL grants.

Example 2b

A random access preamble is received at a first antenna point 3 but not at a second antenna point 4 at a specific random access resource and the relation between first and second antenna points 3, 4 indicates neither uplink nor downlink coverage overlap. Then the random access response may be transmitted only from the first antenna point 3.

In general, the differences above reflect whether the network node 2 has reasons to believe that a received random access preamble originates from one or two different wireless devices 5, 6. For example, Examples 2a and 2b above indicate that it is most likely that only one wireless device 5, 6 transmitted the random access preamble and the differences lies in the probability to reach the wireless device 5, 6 in the downlink. In contrast, in Example 1a, it is uncertain whether it is one or more wireless devices 5, 6 that transmitted the random access preamble. Further analysis could then be performed. For example, in case it indeed was two (or more) wireless devices 5, 6 that transmitted the random access preamble, then the network node 2 would get different UL transmissions (compare Phase 3, arrow 3 of FIG. 4) via different UL grants. In the other case, i.e. if it was only one wireless device 5, 6 that sent the random access preamble, then a single UL transmission would be received in the network node 2. Finally, in Examples 1b and 1c it is most likely two different wireless devices 5, 6 that transmitted the random access preamble, but in Example 1b there has to be some precautions to ensure that the wireless devices 5, 6 are reached with different random access responses.

The random access procedure may be configured via OaM, which may comprise any processor receiving information from various network nodes. For example the downlink random access response scheduling strategy may be, and is currently, configured via OaM. Also, the observation scope in terms of what the network node 2 is expected to monitor may be defined via OaM.

Such configurable observations include statistics concerning random access preamble reception by different antenna point IDs, possibly related to spatial separation of preamble assignments. Preamble reception statistics (for example number of preambles) may be separated per antenna point, antenna point power or related to reception conditions. The statistics can reflect events that can be gathered via counters, where each antenna point is associated to a specific counter or counters. The counters can also be specific to the type of antenna point.

The statistics can also reflect data such as reception conditions. Such reception conditions may comprise received signal power of random access preambles, received signal quality of random access preambles, received preamble signature correlation, received signal correlation/power relative the detection threshold of the antenna point, etc. The reception conditions can be accumulated in a counter, and the number or measurements maintained in a different counter to enable determining the average reception condition. The reception conditions can also be binned in a histogram counter, accumulating radio conditions that fall in specific ranges.

The statistics may be transferred to OaM either regularly, on demand or when some configurable condition has been met. One example of such a configurable condition is when a counter has passed a pre-configured threshold.

For example, the statistics may indicate that it is more common that wireless devices 5, 6 are capable of decoding the random access response sent from low power nodes 3, 4, than from high power antenna points 2. This can be an indication that most wireless devices 5, 6 are covered by low power antenna points 3, 4, and that it is more favorable to send the random access responses from the low power antenna points 3, 4 and then from the macro antenna point 2 at a later time. More generally, the random access procedure statistics indicates the frequency of successful random access procedures per antenna point 2, 3, 4, and this can be used for grouping and ordering the antenna points in the order they should transmit the random access response.

The statistics may also consider data from connected mode communications with wireless devices 5, 6 to learn which nodes (antenna points 2, 3, 4) primarily serves the wireless devices 5, 6. This information can also be used to order nodes to indicate in what order they should transmit random access response to the wireless devices 5, 6.

For example, assume that the antenna points 2, 3 and 4 has a frequency F1, F2, F3, respectively, of receiving random access preambles from connected wireless devices 5, 6 and that F1>F2>F3. Then, random access responses are first sent from the antenna point with frequency F1, then F2 and finally F3. The antenna points 2, 3, 4 can also be grouped, so that antenna point 2 is always used first, followed by antenna points 3 and 4 based on the statistics.

The statistics can also be gathered separately per antenna point type, for example separately for macro antenna points and low power antenna points.

Also, response statistics (both successful and failed), possibly related to random access preamble receptions is gathered to indicate how often a receiving antenna point also becomes a successfully transmitting antenna point. Such information can indicate the power imbalance situation between the uplink and downlink, where more antenna points may receive random access preambles than successfully will be transmitting the random access response.

The uplink and downlink power imbalance can also be analyzed using reception condition statistics and antenna point transmission power information. For example, if the power difference between high power antenna points and low power antenna points is D, then the reception conditions are modified using this difference so that the reception conditions at the wireless device 5, 6 can be estimated.

The statistics can also be used to decide whether there are some antenna points that always should transmit a response, even though the random access preamble was not received in that antenna point. One such antenna point type example is the macro antenna point, or high power antenna point.

Network statistics such as connected mode wireless device 5, 6 reports, or antenna point measurements of connected mode wireless device 5, 6 can be used to learn which antenna points have overlapping coverage, and which do not. This can be gathered e.g. in OaM and an antenna point relation information can be prepared indicating whether it is likely, and also how likely, it is that two specific different antenna points can receive the same random access preamble.

The statistics can also be separated into reception statistics and transmission statistics, meaning that these relations indicate if wireless device 5, 6 can be reached from two specific antenna points simultaneously.

Figure 5:
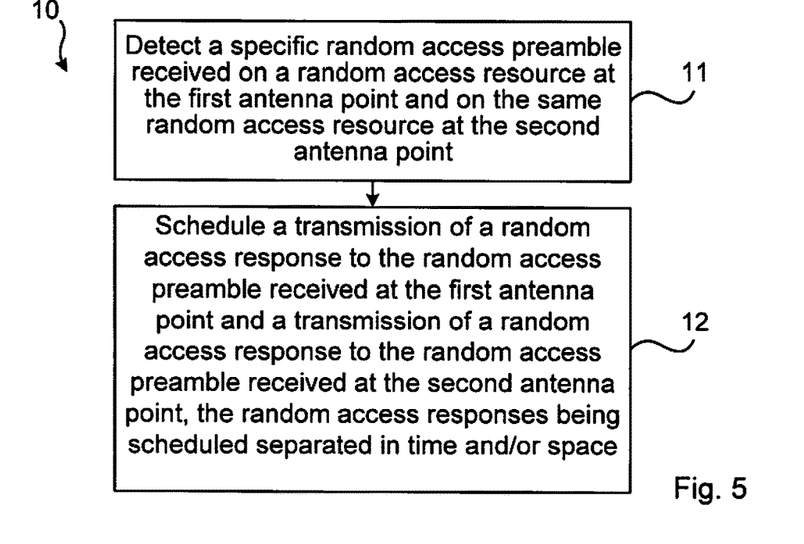
FIG. 5 illustrates a flow chart over steps of a method in a network node in accordance with the present teachings.

FIG. 5 illustrates a flow chart over steps of a method 10 in a network node in accordance with the present teachings and in line with the description as provided hitherto.

The method 10 is performed in a network node 2, wherein the network node 2 controls a first and a second antenna point 3, 4 and uses the same random access resources for the first and the second antenna points 3, 4. The method 10 comprises detecting 11 a specific random access preamble received on a random access resource at the first antenna point 3 and on the same random access resource at the second antenna point 4.

The method 10 further comprises scheduling 12 a transmission of a random access response to the random access preamble received at the first antenna point 3 and a transmission of a random access response to the random access preamble received at the second antenna point 4, wherein the random access responses are scheduled separated in time and/or space.

In an embodiment, the method 10 comprises transmitting 13 one or both scheduled transmissions from the first antenna point 3 and/or from the second antenna point 4 and/or from other antenna points 7, 8 controlled by the network node 2. In some cases, as described earlier, a random access response may be refrained from being transmitted.

In an embodiment, the method 10 comprises associating the random access preamble received from the first antenna point 3 with a first antenna point identifier and the random access preamble received from the second antenna point 4 with a second antenna point identifier.

In a variation of the above embodiment, the method comprises determining, based on the first and second antenna point identifiers, if the random access preambles have been received from two different wireless devices 5, 6 or from a single wireless device 5, 6. If the random access preambles are determined to have been received from a single wireless device 5, 6 an embodiment of the method 10 comprises transmitting one of the scheduled transmissions from the first antenna point 3 and/or from the second antenna point 4 and/or a third antenna point 7, 8.

In an embodiment, the determining is based on historical radio condition statistics related to the first and second antenna points 3, 4, respectively. The historical radio condition statistics may for example comprise one or more of: random access procedure statistics, random access preamble reception statistic, random access response performance statistics, uplink radio conditions, downlink radio conditions, antenna point transmission power, and antenna point reception sensitivity.

In an embodiment, the method 10 comprises associating the reception of the random access preamble received from the first antenna point 3 with one or more parameter related to the first antenna point 3 and the reception of the random access preamble received from the second antenna point 4 with one or more parameter related to the second antenna point 4. In various variations of this embodiment, the parameter comprise one or more of: received signal power of random access preambles, received signal quality of random access preambles, received preamble signature correlation, received signal correlation relative a detection threshold of the respective antenna point 3, 4, historical information, decoding performance and antenna point configuration.

In an embodiment, the transmission of the random access responses is effectuated from the first and second antenna point 3, 4 and the order of transmission is based on measured reception parameter of the random access preamble at the respective antenna point 3, 4. Different variations of this embodiment has been described earlier, and the order of transmission may for example comprise the order of decreasing measured reception parameters at the respective antenna points 3, 4, or decreasing transmission power at the respective antenna points 3, 4.

In an embodiment, the random access responses are scheduled separated in time and/or space over a random access response window.

In an embodiment, the random access response comprises an acknowledgment of receipt of the random access preamble received from the first antenna point and from the second antenna point 3, 4.

In an embodiment, the random access responses are transmitted separated in space by the random access responses comprising different content. In a variation of this embodiment, the random access responses are transmitted simultaneously from the first and second antenna points 3, 4.

Figure 6:
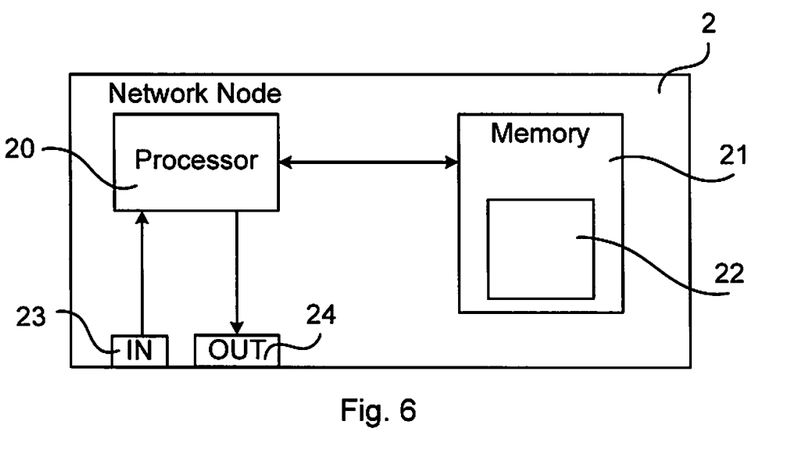
FIG. 6 illustrates schematically a network node and means for implementing methods of FIG. 5.

With reference to FIG. 6, the present teachings also encompass the network node 2. In particular, FIG. 6 illustrates schematically a network node 2 and means for implementing the various embodiments of the method as described. The network node 2, and in particular a processor 20 thereof, is configured to control a first and a second antenna point 3, 4. The network node 2 is configured to use the same random access resources for the first and the second antenna points 3, 4. The network node 2 comprises a processor 20 and memory 21. The memory 21 contains instructions executable by the processor 20, whereby the network node 2 is operative to perform any of the embodiments of the method 10 as described. In particular, the network node 2 is operative to:

detect a specific random access preamble received on a random access resource at the first antenna point 3 and on the same random access resource at the second antenna point 4, and schedule 12 a transmission of a random access response to the random access preamble received at the first antenna point 3 and a transmission of a random access response to the random access preamble received at the second antenna point 4, the random access responses being scheduled separated in time and/or space.

The network node 2 may be a base station, such as a eNodeB, but may more generally comprise a centralized network unit handling the communication via two or more antenna points 3, 4. Sometimes this is referred to as a main unit, while the antenna points 3, 4 are remote units. The communication interface to the antenna points 3, 4 may be wired or wireless, wherein wired connections can be fiber, copper, or any other means. The interface can be on radio frequencies, or base band, it can be analog or digital. One example is CPRI (Common Public Radio Interface), which is a digital interface for base band data.

The memory 21 can be any combination of read and write memory (RAM) and read only memory (ROM). The memory 21 may also comprise persistent storage, which may, for example, be any single one or combination of magnetic memory, optical memory, solid state memory or even remotely mounted memory.

The network node 2 further comprises an input/output device 23, 24, embodied as one or more separate units or as a single unit. By means of such input device(s) 23, the network node 2 may receive data from the wireless device 5 (via antennas, not illustrated) and from other network nodes 3, 4 (e.g. via interconnecting cables, not illustrated). By means of such output device(s) 24 the network node 2 may transmit data to the wireless device 5 (via antennas, not illustrated) and to other network nodes 3, 4 (e.g. via interconnecting cables, not illustrated). The input device(s) 23 and the output device(s) 24 are operatively connected to the processor 20, which is thus able to transmit instructions to the wireless device 5 (via antennas, not illustrated), e.g. based on information received from the wireless device 5. Other components of the network node 2 are omitted in order not to obscure the concepts presented herein.

With reference still to FIG. 6, the present teachings also encompass computer programs and computer program products.

The computer program product, e.g. the memory 21, thus comprises instructions executable by the processor 20. Such instructions may be comprised in a computer program 22, or in one or more software modules or function modules.

Figure 7:
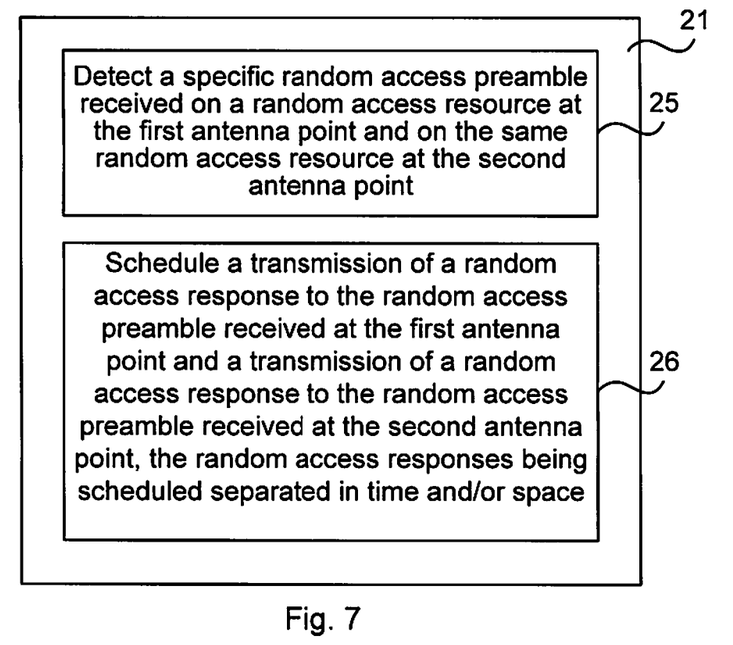
FIG. 7 illustrates a computer program product comprising functions modules/software modules for implementing method of FIG. 5.

An example of an implementation using functions modules/software modules is illustrated in FIG. 7, in particular illustrating a computer program product comprising functions modules for implementing methods of FIG. 5. The memory 21 comprises means 25, in particular a first function module 25, for detecting a specific random access preamble received on a random access resource at the first antenna point 3 and on the same random access resource at the second antenna point. The memory 21 comprises means 26, in particular a second function module 26, for scheduling a transmission of a random access response to the random access preamble received at the first antenna point 3 and a transmission of a random access response to the random access preamble received at the second antenna point 4, the random access responses being scheduled separated in time and/or space. Based on this, an embodiment of the network node may be implemented. In particular, in an embodiment, the network node 2 comprises means 25 for detecting a specific random access preamble received on a random access resource at the first antenna point 3 and on the same random access resource at the second antenna point, and means 26 for scheduling a transmission of a random access response to the random access preamble received at the first antenna point 3 and a transmission of a random access response to the random access preamble received at the second antenna point 4, the random access responses being scheduled separated in time and/or space.

The computer program 22 is provided for a network node 2 controlling a first and a second antenna point 3, 4, wherein the network node 2 uses the same random access resources for the first and the second antenna points 3, 4. The computer program 22 comprises computer program code, which, when run on the network node 2, and in particular the processor 20 thereof, causes the network node 2 to detect a specific random access preamble received on a random access resource at the first antenna point and on the same random access resource at the second antenna point; and schedule a transmission of a random access response to the random access preamble received at the first antenna point and a transmission of a random access response to the random access preamble received at the second antenna point, the random access responses being scheduled separated in time and/or space.

The invention has mainly been described herein with reference to a number of embodiments. However, as is appreciated by a person skilled in the art, other embodiments than the particular ones disclosed herein are equally possible within the scope of the invention, as defined by the appended patent claims.

The invention claimed is:

1. A method performed in a network node, the network node controlling at least two antenna points and using the same random access resources for the at least two antenna points, the method comprising:
   detecting a specific random access preamble received on a random access resource at a first antenna point and on the same random access resource at a second antenna point; and
   responsive to determining that the specific random access preamble received at the first antenna point and the specific random access preamble received at the second antenna point have been received from two different wireless devices, scheduling a first transmission of a random access response to the random access preamble received at the first antenna point and scheduling a second transmission of a random access response to the random access preamble received at the second antenna point, the first and second transmissions of the random access responses being scheduled separated in time from each other and from any other random access response to the detected specific random access preamble received on the same random access resource at a third antenna point controlled by the network node.

2. The method of claim 1, further comprising:
   transmitting at least one of the first and second transmissions from one or a combination of the first antenna point, the second antenna point, and any other antenna points controlled by the network node, according to the transmission schedule.

3. The method of claim 2, wherein the first and second transmissions of the random access responses is effectuated from the first and second antenna point and wherein the order of transmission is based on measured reception parameter of the random access preamble at the respective antenna point.

4. The method of claim 3, wherein the order of transmission comprises the order of decreasing measured reception parameters at the respective antenna points, or decreasing transmission power at the respective antenna points.

5. The method of claim 1, further comprising associating the random access preamble received from the first antenna point with a first antenna point identifier and the random access preamble received from the second antenna point with a second antenna point identifier.

6. The method of claim 5, further comprising determining that the random access preambles have been received from two different wireless devices based on the first and second antenna point identifiers.

7. The method of claim 6, wherein the determining is based on historical radio condition statistics related to the first and second antenna points, respectively.

8. The method of claim 7, wherein the historical radio condition statistics comprises one or more of random access procedure statistics, random access preamble reception statistic, random access response performance statistics, uplink radio conditions, downlink radio conditions, antenna point transmission power, and antenna point reception sensitivity.

9. The method of claim 1, further comprising associating the reception of the random access preamble received from the first antenna point with one or more parameters related to the first antenna point and the reception of the random access preamble received from the second antenna point with one or more parameters related to the second antenna point.

10. The method of claim 9, wherein the one or more parameters related to either of the first and second antenna points comprise one or more of: received signal power of random access preambles, received signal quality of random access preambles, received preamble signature correlation, received signal correlation relative a detection threshold of the respective antenna point, historical information, decoding performance and antenna point configuration.

11. The method of claim 1, wherein the first and second transmissions of the random access responses are scheduled separated in time and/or space over a random access response window.

12. The method of claim 1, wherein the random access response comprises an acknowledgment of receipt of the random access preamble received from the first antenna point and from the second antenna point.

13. The method of claim 1, wherein the random access responses are transmitted separated in space by the random access responses comprising different content.

14. The method of claim 13, wherein the random access responses are transmitted simultaneously from the first and second antenna points.

15. A network node configured to control at least two antenna points, the network node being configured to use the same random access resources for the at least two antenna points, the network node comprising a processor and memory, the memory containing instructions executable by the processor whereby the network node is operative to:
  detect a specific random access preamble received on a random access resource at a first antenna point and on the same random access resource at a second antenna point; and
  responsive to determining that the specific random access preamble received at the first antenna point and the specific random access preamble received at the second antenna point have been received from two different wireless devices schedule a first transmission of a random access response to the random access preamble received at the first antenna point and schedule a second transmission of a random access response to the random access preamble received at the second antenna point, the first and second transmissions of the random access responses being scheduled separated in from each other and from any other random access response to the detected specific random access preamble received on the same random access resource at a third antenna point controlled by the network node.

16. The network node of claim 15, wherein the memory further contains instructions executable by the processor whereby the network node is operative to:
  transmit at least one of the first and second transmissions from one or a combination of the first antenna point, the second antenna point, and any other antenna points controlled by the network node, according to the transmission schedule.

17. The network node of claim 15, wherein the memory further contains instructions executable by the processor whereby the network node is operative to associate the random access preamble received from the first antenna point with a first antenna point identifier and the random access preamble received from the second antenna point with a second antenna point identifier.

18. The network node of claim 17, wherein the memory further contains instructions executable by the processor whereby the network node is operative to determine that the random access preambles have been received from two different wireless devices based on the first and second antenna point identifiers.

19. A non-transitory computer-readable medium comprising, stored thereupon, a computer program for a network node controlling at least two antenna points, the network node using the same random access resources for the at least two antenna points, the computer program comprising computer program code configured so that, when the computer program code is run on the network node the computer program code causes the network node to:
  detect a specific random access preamble received on a random access at a first antenna point and on the same random access resource at a second antenna point; and,
  responsive to determining that the specific random access preamble received at the first antenna point and the specific random access preamble received at the second antenna point have been received from two different wireless devices schedule a first transmission of a random access response to the random access preamble received at the first antenna point and schedule a second transmission of a random access response to the random access preamble received at the second antenna point, the first and second transmissions of the random access responses being scheduled separated in from each other and from any other random access response to the detected specific random access preamble received on the same random access resource at a third antenna point controlled by the network node.

* * * * *